US010623186B1

(12) United States Patent
Mehr

(10) Patent No.: US 10,623,186 B1
(45) Date of Patent: Apr. 14, 2020

(54) AUTHENTICATED ENCRYPTION WITH MULTIPLE CONTEXTS

(71) Applicant: Amazon Technologies, Inc., Reno, NV (US)

(72) Inventor: Nima Sharifi Mehr, Vancouver (CA)

(73) Assignee: Amazon Technologies, Inc., Seattle, WA (US)

( * ) Notice: Subject to any disclaimer, the term of this patent is extended or adjusted under 35 U.S.C. 154(b) by 208 days.

(21) Appl. No.: 15/809,741

(22) Filed: Nov. 10, 2017

(51) Int. Cl.
*H04L 9/32* (2006.01)
*H04L 9/06* (2006.01)
*H04L 29/06* (2006.01)
*H04L 9/08* (2006.01)
*H04L 9/14* (2006.01)

(52) U.S. Cl.
CPC .......... *H04L 9/3226* (2013.01); *H04L 9/0618* (2013.01); *H04L 9/0822* (2013.01); *H04L 9/0861* (2013.01); *H04L 9/14* (2013.01); *H04L 63/0428* (2013.01)

(58) Field of Classification Search
CPC ....... H04L 9/3226; H04L 9/0822; H04L 9/14; H04L 63/0428; H04L 9/0618; H04L 9/0861
See application file for complete search history.

(56) References Cited

U.S. PATENT DOCUMENTS

| | | | |
|---|---|---|---|
| 9,806,887 B1* | 10/2017 | Campagna | H04L 9/0637 |
| 2006/0126850 A1* | 6/2006 | Dawson | H04L 63/0428 380/284 |
| 2008/0137869 A1* | 6/2008 | Robert | H04N 7/163 380/278 |
| 2015/0186657 A1* | 7/2015 | Nakhjiri | H04L 63/06 713/155 |
| 2016/0294549 A1* | 10/2016 | Qian | H04L 9/0822 |
| 2016/0323250 A1* | 11/2016 | Winter | H04L 63/0428 |
| 2017/0171219 A1* | 6/2017 | Campagna | H04L 63/123 |

* cited by examiner

*Primary Examiner* — Matthew Smithers
*Assistant Examiner* — Mirza Israr Javed
(74) *Attorney, Agent, or Firm* — Hogan Lovells US LLP

(57) ABSTRACT

Multi-context authenticated encryption can be used to secure various data objects, where a data object may be transmitted and/or stored using various types of resources. One or more envelope keys can be used to encrypt the body data, and each envelope key can be encrypted with a master key. The envelope keys are also be encrypted using at least a subset of context information available for the data object, as may correspond to one or more of the resource types. The encrypted data object can include at least one header, as well as the encrypted body data and the encrypted envelope key(s). In order to decrypt the data object, a data consumer would need the master key as well as at least a relevant subset of the context data.

20 Claims, 8 Drawing Sheets

300

ENCRYPTED_ENVELOPE_KEY_0 = ENCRYPT (Key=MasterKey, data=EnvelopeKey, aad=contextA)

302

ENCRYPTED_ENVELOPE_KEY_1 = ENCRYPT (Key=MasterKey, data=EnvelopeKey, aad=contextB)

ENCRYPTED_MESSAGE = ENCRYPT (key=EnvelopeKey, data=message, aad=ENCRYPTED_ENVELOPE_KEY_0 || ENCRYPTED_ENVELOPE_KEY_1)

CIPHER_TEXT = ENCRYPTED_ENVELOPE_KEY_0 || ENCRYPTED_ENVELOPE_KEY_1 || ENCRYPTED_MESSAGE

First attempt (decryption fails for improper aad):
ENVELOPE_KEY = DECRYPT (Key=MasterKey, data=ENCRYPTED_ENVELOPE_KEY_0, aad=contextB)

304

Second attempt (decryption passes):
ENVELOPE_KEY = DECRYPT (Key=MasterKey, data=ENCRYPTED_ENVELOPE_KEY_1, aad=contextB)

306

MESSAGE = DECRYPT (Key= ENVELOPE_KEY, data = ENCRYPTED_MESSAGE, aad = ENCRYPTED_ENVELOPE_KEY_0 || ENCRYPTED_ENVELOPE_KEY_1)

AUTHENTICATED ENCRYPTION WITH MULTIPLE CONTEXTS

BACKGROUND

As an increasing number of applications and services are being made available over networks such as the Internet, an increasing number of content, application, and service providers are turning to technologies such as remote resource sharing and cloud computing. Cloud computing, in general, is an approach to providing access to electronic resources through services, such as Web services, where the hardware and/or software used to support those services is dynamically scalable to meet the needs of the services at any given time. A user or customer typically will rent, lease, or otherwise pay for access to resources through the cloud, and thus does not have to purchase and maintain the hardware and/or software to provide access to these resources. In some systems users are able to access data stored using different types of resources, or provided using different services. In order to secure the data stored by these various resources or services, authenticated encryption algorithms can be used that provide both data authenticity and confidentiality. These algorithms can ingest authenticated data during the encryption phase, where matching authentication data is used to subsequently decrypt the information. If specific data is encrypted for different types of resources or services, however, the decryption process may be unaware of the different encryption used for the data and thus might fail to provide the appropriate authenticated information needed to decrypt the data.

BRIEF DESCRIPTION OF THE DRAWINGS

Various embodiments in accordance with the present disclosure will be described with reference to the drawings, in which:

FIG. 3 illustrates example values that can be used to provide for authenticated encryption for multiple contexts that can be utilized in accordance with various embodiments.

DETAILED DESCRIPTION

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Systems and methods in accordance with various embodiments of the present disclosure overcome one or more of the aforementioned and other deficiencies experienced in conventional approaches to encrypting data in a network environment. In particular, various embodiments provide for multi-context authenticated encryption for various data objects. A data object, such as a message, may be transmitted and/or stored using various resources, and may be encrypted for different types of these resources. One or more envelope keys can be used to encrypt the body data for the message, and each envelope key can also be encrypted with a master key for the data, such as may correspond to an owner of the data. The envelope keys can also be encrypted using at least a subset of context information available for the data object, as may correspond to one or more of the resource types. The encrypted data object, which may take the form of cipher text, can then include at least one header, as well as the encrypted body data and the encrypted envelope key(s). In order to decrypt the data object, a data consumer would need the master key as well as at least a relevant subset of the context data, serving as additional authenticated data (AAD) for the encrypted data object, to decrypt at least one of the relevant envelope keys.

Various other such functions can be used as well within the scope of the various embodiments as would be apparent to one of ordinary skill in the art in light of the teachings and suggestions contained herein.

Figure 1:
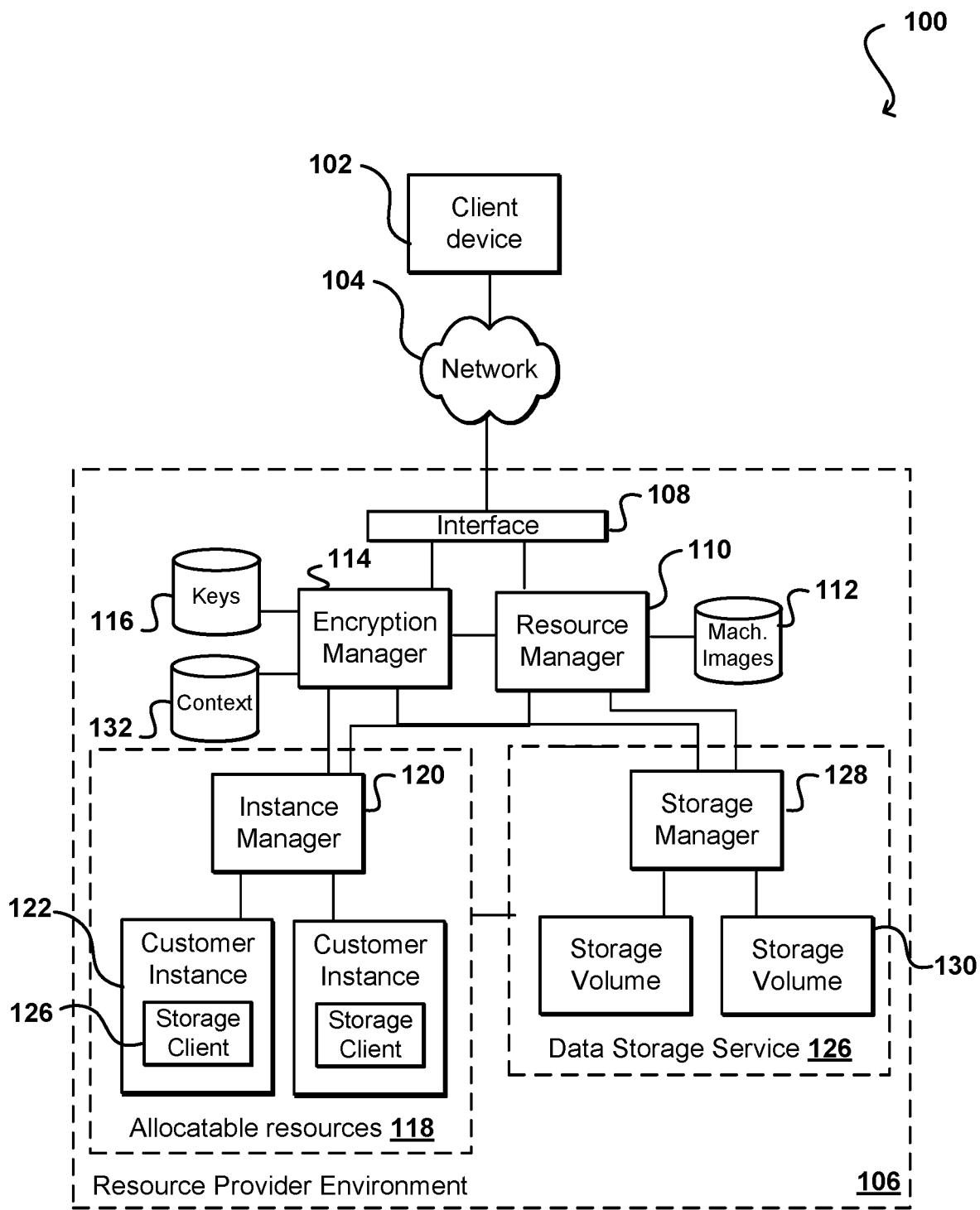
FIG. 1 illustrates an example system for providing authenticated encryption for multiple contexts that can be utilized in accordance with various embodiments.

FIG. 1 illustrates an example system 100 that can be implemented in accordance with various embodiments. In this example, a user wanting to access data stored in a resource provider environment 106 can utilize a client device 102 to submit a request, such as through an application, console, or application programming interface (API), over at least one network 104 to be received to an interface layer 108 of a resource provider environment 106, service provider environment, or other shared-resource or multi-tenant environment as discussed herein. Information for the request can be directed to a resource manager 110 which can manage resource access and allocation for various customers having accounts with the resource provider. The resource manager 110 can work with an instance manager 120, or other manager or management service configured to manage access and/or utilizations of various types of resources, services, or nodes as discussed elsewhere herein. A first request can be received to cause a customer instance 122, such as a virtual machine instance, to be allocated on behalf of the customer, such as to store data to be accessible by the customer. The resource manager 110 in this example can also work, directly or indirectly, with a storage manager 128 of a data storage service 126, such as a block storage service or archival storage service, to allocate a storage volume 130 to be used to store data for customer. A storage client 124 executing as part of a workspace on the customer instance 122 can cause data to be transmitted between the customer instance 122 and the corresponding storage volume 130 in some embodiments, while different data may be stored by the storage client 126 and storage volume 130 for the customer in other embodiments.

In various embodiments the data storage volume 130, and data transmitted between the storage client 124 and storage volume 130, can be encrypted by default as part of an instance or workspace service. In other embodiments a customer or other entity may select whether or not to perform such encryption, and further encryption used to store data to the storage volume 130 may be different than the encryption used to store data to the storage client 126. As mentioned, the encryption can be performed independent of, or without knowledge on the part of, the underlying operating system for the customer instance 122. Upon setting up an account or service for a specific customer, an encryption manager 114 or key management service, for example, can manage aspects of the encryption on behalf of the customer. This can include, for example, generating a master key specific to that customer, that can be stored to a key data store 116 or other such location. In this example a customer master key is not exported or available outside the encryption service, or at least outside the resource provider environment. The master key will be maintained by the encryption manager 114 and used to generate individual data encryption keys to be used with the various workspaces, resources, or services within, or potentially even outside, the resource provider environment. There can be a separate data encryption key generated for each workspace, service, resource, or type of resource associated with a customer account. As mentioned, there may be multiple users under a customer account, such as employees of a company having an account with the resource provider. There can be a single master key for that company, and that master key can be used to generate workspace-specific data encryption keys for the workspaces provided for the associated users.

In some approaches, a specific data encryption key (e.g., an envelope key) can be generated, using the customer master key, for each authorized user or each workspace, service, or type of resource corresponding to a customer account. In at least some embodiments, unique data encryption keys can be generated for each storage volume 130 or instance. As mentioned, the encryption in some embodiments can be performed using authenticated encryption algorithms, which can provide both data authenticity and confidentiality. The algorithms can ingest additional authenticated data ("AAD") during the encryption phase for use in the encryption. The AAD will not be included in the cipher-text output of the encryption, but can instead be applied on the cipher-text in such a way that in order to decrypt the data, the decryption logic can be required to verify whether the cipher-text was encrypted with a given AAD. The AAD used for the encryption can differ for each resource, service, or workspace used to store, host, or utilize the data. Thus, the AAD can be thought of, or referred to, as a context for the particular encryption, as it can relate to a specific resource or type of resource hosting that instance of the data, and for which the data was encrypted. The process decrypting the data can then verify whether a given cipher-text was in fact encrypted under the appropriate assumed context. For the example of FIG. 1, there might be a first context corresponding to the allocable resources 118, customer instance 122, and/or storage client 126, and a second context corresponding to the data storage service 126 or a particular storage volume 130, among other such options. The encryption manager 114 can manage the context information and relevant encryption keys, where the keys can be stored to a key data store 116 and information for the context can be stored to a context data store 132 in some embodiments. When data is to be decrypted for access by, or from, the storage client 126, the decryption should utilize the first context AAD information that corresponds to that particular resource type. If the decryption process instead used the second context for the storage volume 130 then the decryption would fail.

As an example, a process might encrypt a document for a specific context, such as by using the AAD of "storage-path=store://my-encrypted-data/abc.dat" and upload it to the storage resource under the path specified in the AAD. Another process which is reading and decrypting objects from this storage resource (i.e., a storage bucket) can verify whether each object was in fact originally encrypted for the same context (i.e., the same bucket path) by passing the expected AAD/context to the decryption algorithm. The decryption will fail if the expected AAD/context does not match the AAD/context used to encrypt the document.

In a conventional implementation of such an encryption algorithm, the AAD is an opaque sequence of bytes passed to the encryption mechanism. The decryption mechanism then needed to provide exactly the same sequence of bytes as the AAD to successfully decrypt a cipher-text encrypted using that AAD. There are scenarios as discussed with respect to FIG. 1, however, where data is encrypted for two or more contexts, such as a storage client 126 and a storage volume 130, or a storage bucket and a storage queue, among other such options. If a decryption process is unaware of all the relevant contexts and ingests the data from one of these contexts, the decryption process may fail to create a valid expected AAD for the corresponding context.

Accordingly, approaches in accordance with the various embodiments can provide a mechanism for accepting one of a set of AAD values, or context strings, for use in decrypting data which is encrypted using authenticated encryption algorithms for multiple contexts. An envelope-based encryption scheme can be used with an envelope key that is encrypted by a master key multiple times, including one encryption for each relevant context, or using each relevant AAD. The master key can be used to encrypt an envelope key, where the envelope key can be used to encrypt the data object (e.g., a message, document, etc.). The data itself can be encrypted using the envelope key and a sequence of multiple encrypted envelope keys as the additional authenticated data (AAD). The process decrypting the data can examine the expected context with each of encrypted envelope keys until the context can be used to successfully decrypt one of the envelop keys. Having obtained a decrypted envelop key, the decrypting process can decrypt the encrypted message using that envelope key and the sequence of encrypted envelope keys as the additional authenticated data.

An example cryptography algorithm that can be used takes advantage of the Galois/Counter Mode (GCM) mode of operation. The GCM mode can be used for symmetric key cryptographic block ciphers, for example, which provides high performance at high throughput. This can be beneficial for encryption used for high speed communication channels, for example. In a counter mode, blocks can be numbered sequentially and encrypted with a block cipher such as AES, and processed with the plain text to produce a cipher text. GCM combines this counter mode approach to encryption with the Galois mode of authentication that provides for data integrity as well as authenticity. An advantage to a GCM approach over other approaches is that a second authentication mechanism is not needed, as the authentication is built into the process for encrypting the data. The GCM approach provides for integrity audits as well as the data authentication. The AAD itself is not encrypted, but will be used in the encryption of the source data. In order to decrypt the source data, the same AAD must be supplied, protecting the context in which the data is encrypted. As mentioned, the AAD or context information can relate to a specific database in which the customer's encrypted data will be stored. Each record in the database can include a customer identifier and a data field, for example, where the data field includes data encrypted for the relevant context. In another example, when encrypted data is written to a storage bucket the bucket itself can become the context. An identifier or path for the bucket can be used, and in some embodiments can also include information such as a user identifier so that other users using that bucket may not be able to decrypt the data for that context. If someone wants to decrypt the data, then, the person has to provide the appropriate additional authenticated data (AAD) for the relevant context. If there are five pieces of information needed for the AAD, providing only four of those pieces will cause the decryption to fail.

Figure 2:
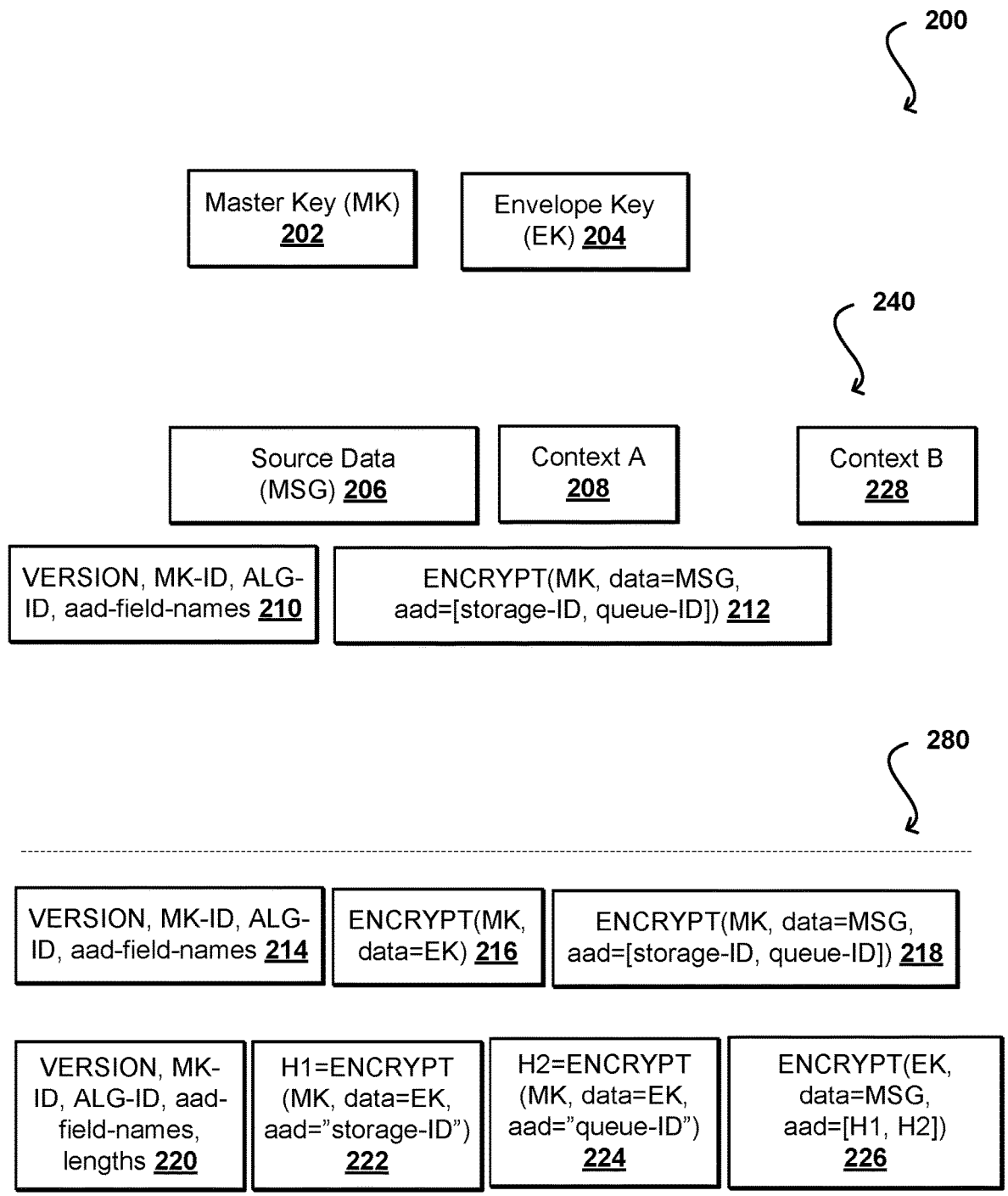
FIG. 2 illustrates example elements of an authenticated encryption process that can be utilized in accordance with various embodiments.

FIG. 2 illustrates an example encryption approach 200 that can be used in accordance with various embodiments. In this example, there is source data 206 that is to be encrypted for storage to two different locations, such as a storage bucket of a first service and a queue of a queuing service, among other such options. As mentioned, each storage location would have a corresponding context, with the bucket having Context A 208 in this example and the queue having Context B 228. There can be more than two contexts as well as discussed herein. Information for both contexts 208, 228 will then be used to encrypt the source data 206. If a decrypting process attempts to pass only Context A 208, for example, to decrypt the data, without knowing of the other Context B 228, the decryption process can fail. If the process is aware of Context B, and can include that information in the process, the decryption can succeed with the requestor being unaware of the data also being stored to Context B. In some embodiments the other context data will be used as AAD, while in other embodiments the source data might be encrypted multiple times for the various contexts as discussed elsewhere herein.

In at least some situations it may not be practical to require knowledge of all relevant contexts. For example, customers may want to authenticate themselves to a system through various ways. If each authentication approach provides a separate identifier or identity ID that is used as part of that context, the system would then have to manage the various IDs for that user and determine which need to be considered as part of the authenticated data for each mechanism. This can be quite cumbersome and have significant potential for error, particularly where the systems utilized can change frequently. Approaches in accordance with various embodiments can thus secure the source data for the various contexts without encrypting the source data, or at least the entire source data, multiple times. In some embodiments a data consumer can provide partial authenticated data, or a subset of the available data to use as the authenticated data. In this way, instead of having to provide full information for all contexts to a decryption mechanism, the data consumer can pass the minimum amount of information needed for the decryption. For example, instead of providing a unique user identifier and other metadata specific for a particular context, the approach could instead provide merely the link, address, resource identifier, or resource name, such as an Amazon Resource Name (ARN) for the Simple Queue Service (SQS), or a Simple Storage Service (S3) bucket path for the S3 service offered by Amazon.com, Inc. In this way, a data consumer could pass the SQS-ARN as the context data, such as for Context B 228, or the S3 bucket path for S3, to decrypt the data.

Approaches in accordance with various embodiments can leverage a technique such as envelop-based encryption to include information for the various contexts without encrypting the source data multiple times using different additional data. A master encryption key 202 is used, but the master key is not used to encrypt all of the data. Instead, an envelope key is generated, such through a random key generation process, and the envelope key can be used to encrypt the source data. The envelope key 204 can then be encrypted using the master key 202. Such an approach facilitates shallow key rotation, and can allow for longer key lifetimes that conventional processes.

Another approach that can be utilized in accordance with various embodiments builds upon an envelope-based encryption scheme to allow for optional authenticated data in the encryption mechanism. In such an approach the system can again generate a random key as the envelope key 204, which can be used to encrypt the source data 206. The envelope key itself will then also be encrypted using additional authenticated data. The authenticated data is not used to encrypt the source data, but used to encrypt the envelope key(s) used to encrypt the data. In one embodiment, the envelope key can be encrypted multiple times, such that a 256 byte asymmetric encryption key might be encrypted randomly for each of the relevant contexts, instead of the source data that might be tens of megabytes or more. The header portion of the envelope generated can have two encrypted envelope keys, each of which is encrypted with the master key but with different authenticated data passed by the relevant scheme, such as a GCM scheme. The body of the data, when encrypted, uses the randomly generated envelope key. As the additional authenticated data, the other encrypted envelope key can be passed. If there are multiple contexts, then there can be more than one encrypted envelope key used for the AAD for that data object. Such an approach can help to avoid someone simply swapping the header, which includes the encrypted envelope keys, and the body portion with different messages or data, etc. In order to decrypt the data object, the data consumer may receive the data in Context A 208. The data consumer will have the master key 202 and can attempt to decrypt the first encrypted envelope key. If the first encrypted envelope key is encrypted for Context B then the decryption will fail and the process will move onto the second envelope key. The process can then attempt to decrypt the second envelope key using the Context A information, and if that key was encrypted for Context A then the decryption will pass. The decrypted envelope key can then be used to decrypt the body of the message or other source data 206, along with the remaining encrypted envelope keys. In some embodiments where there may be multiple contexts, it may be beneficial to include or attach metadata at the end of the envelope to indicate which key to use if specific context fields are included, etc. This can help to improve performance by avoiding the need to brute force all the keys attached to the envelope. A data consumer can still decrypt the data without this additional information, however, using the known context information that may be relevant.

In a first approach 240 of the example of FIG. 2, the source data 206 corresponds to a message to be encrypted. In this example the message is to be encrypted for Context A 208. Context B may also store an encrypted version of the source data 206 message. There is not limitation on the context data in some embodiments, as long as the context is of a type appropriate for the implementation, such as may include a byte stream of data. In order to utilize envelope-based encryption the Context A 208 data can be passed along with the master key 202. In order to encrypt using the master key 202 with envelope encryption, an encrypt call 212 can be made that passes in the master key 220, the source data 206, and the AAD, which corresponds to Context A. The header 210 after the encryption can include other information or metadata relating to the version, master key identifier, algorithm identifier, and AAD field names, among other such options, which are needed to decrypt the data. The resulting encrypted data object would thus include the header 210 and an encrypted body portion. Instead of being encrypted using the master key 202, however, the data is encrypted using the envelope key 204 which may be generated dynamically during the encryption process, and the envelope key 204 is encrypted using the master key 202, with the encrypted envelope key being included with the header and the encrypted body in the encrypted data object. Thus, in such an approach there might be a call 216 to encrypt the envelope key with the master key, and a call 226 to encrypt the data with the envelope key and the AAD. There can then be two encrypted envelope keys for the different contexts, where a first context encryption 222 utilizes the context information for a first storage context and a second context encryption 224 utilizes the context information for the second storage context. As illustrated, the encryption of the data for a given context uses the respective envelope key but also passes information for the other envelope keys as AAD. The resulting data object would still include a similar header, but can include the encrypted envelope keys as well as the encrypted source data using the AAD.

In order to decrypt such a data object, it would be necessary in some embodiments to provide the entire or accurate AAD. A data consumer should have the master key, which may be obtained from an appropriate source such as a key management service or encryption manager, among other such options. The data consumer can then call a decrypt API, for example, passing the master key and the full AAD. The master key can be used to decrypt the envelope keys, and once decrypted the appropriate envelope key can be used to decrypt the body message. The decryption could also require, however, the proper AAD as discussed elsewhere herein. In some embodiments the data consumer can provide the master key with only the information relevant for one of the contexts, where the AAD provided will depend at least in part upon the relevant context. Thus, the data consumer could decrypt the message using either H1 222, the first encrypted envelope key, or H2 224, the second encrypted envelope key. The body of the message then does not receive the two pieces of data as AAD, but instead receives the headers H1 and H2, which correspond to the encrypted envelope keys. In order to decrypt, the process has the master key derived from the identified master key ID in the header 220 and knows the context from which the key was received, and can provide the appropriate context with the master key to decrypt the envelope key and then the body data.

Further, as mentioned, there can be additional information in the header that helps to simplify the process. For example, information about various lengths can be included, as may relate to specific headers, the body, etc., so the data consumer can attempt to decrypt one of the headers then cache the relevant index location. Thus, if a data consumer sees a particular context they can quickly determine which header to decrypt. The header information can also exclude any confidential information, but can include helpful references to assist with the decoding. Thus, the encrypted object can include the headers 222, 224, encrypted message 226, and additional information 220 useful for the decryption.

In some embodiments the encryption, decryption, and/or key management functionality can be offered through one or more systems or services that are available to various customers. These can be offered by the same or different entities, which may also be separate from the entities useful for storing the encrypted data. In other embodiments a software development kit (SDK) or other offering can be provided that enables customers to implement, or at least access, such functionality directly through software. In at least some embodiments, the authenticated data is also not stored in a particular location but is instead derived from the relevant context from which the data consumers receive the data. For a data queue, for example, the context can be derived or obtained from the queue resource name using a determined algorithm.

FIG. 3 illustrates an example set 300 of calls and/or definitions that can be used for a pair of contexts for which data is encrypted. The contexts in this example are contextA and contextB, and the symbol || used to indicate concatenation of two different terms, which can be joined to form a single value string in some embodiments. In this example, there are two encrypted envelope keys generated in a set of elements 302 for an encrypted data object. A first encrypted envelope key is encrypted with the MasterKey with contextA as the AAD, and a second encrypted envelope key is encrypted with the MasterKey with contextB as AAD. The encrypted message is then illustrated to be encrypted using the envelope key, along with the AAD of the concatenated string that includes the two encrypted envelope keys. The generated cipher-text in this example includes the concatenated string of the first and second encrypted envelope keys along with the encrypted message.

In a first decryption attempt 304 for the cipher-text, an attempt is made to decrypt the envelope key using the master key, the first encrypted envelope key for contextA, and the AAD of contextB. Since the AAD is for a different context than the encrypted envelope key, the decryption attempt will fail. In a second decryption attempt 306 for the cipher-text, an attempt is made to decrypt the envelope key using the master key, the second encrypted envelope key for contextB, and the AAD of contextB. Since the AAD is for the same context as the encrypted envelope key, the decryption attempt will succeed. Thus, a decrypting process which receives cipher text and its expected context B can go through each encrypted envelope key (here, ENCRYPTED_ENVELOPE_KEY_0 and ENCRYPTED_ENVELOPE_KEY_1) until one of the envelope keys can be successfully decrypted. After successful decryption of an envelope key, the process can use the decrypted envelope key along with all the encrypted envelope keys as additional authenticated data (AAD) to decrypt the message itself. Once an envelope key is successfully decrypted, a call 308 can be made to decrypt the message using the envelope key and the encrypted envelope keys as the AAD as illustrated. In some embodiments, the encrypting process can embed information in the cipher text to assist decrypting processes in identifying which encrypted envelope key should be able to be decrypted for a relevant context. For example, the cipher text can contain an index mapping the name of contexts to the encrypted envelope keys.

Such encryption approaches can be used advantageously for various types of data storage systems or systems that access or process data. This can also be used advantageously for the transmission of data in some embodiments. Source data can be encrypted before being placed into a communication channel, which can have a corresponding context. If a service has two endpoints and the intent is to send the data to a specific endpoint, that designation can become part of the context. The data consumer receiving the data can then attempt to decrypt the data utilizing that context. A malicious entity redirecting the data to a different endpoint will be unable to properly decrypt the data without having the appropriate context information needed for the decryption. Such an approach may be used advantageously with Internet of things (IoT) devices where data is communicated to a determined endpoint. In some embodiments, the additional overhead needed for such encryption management may be at least partially reduced by only using this approach for messages where the source data is of at least a minimum size, such as at last 1 Mb, as otherwise the burden of the extra headers may not justify the additional cost.

Yet another embodiment can utilize multiple master keys to encrypt the data. If, for example, a first set of resources is unavailable then a second set of resources might be needed to access the data, and that second set of resources might have a different master key, such as for being located in a different physical facility or geographical location. A similar approach can be used with the envelope keys, but those keys can be encrypted using multiple master keys as appropriate.

Figure 4:
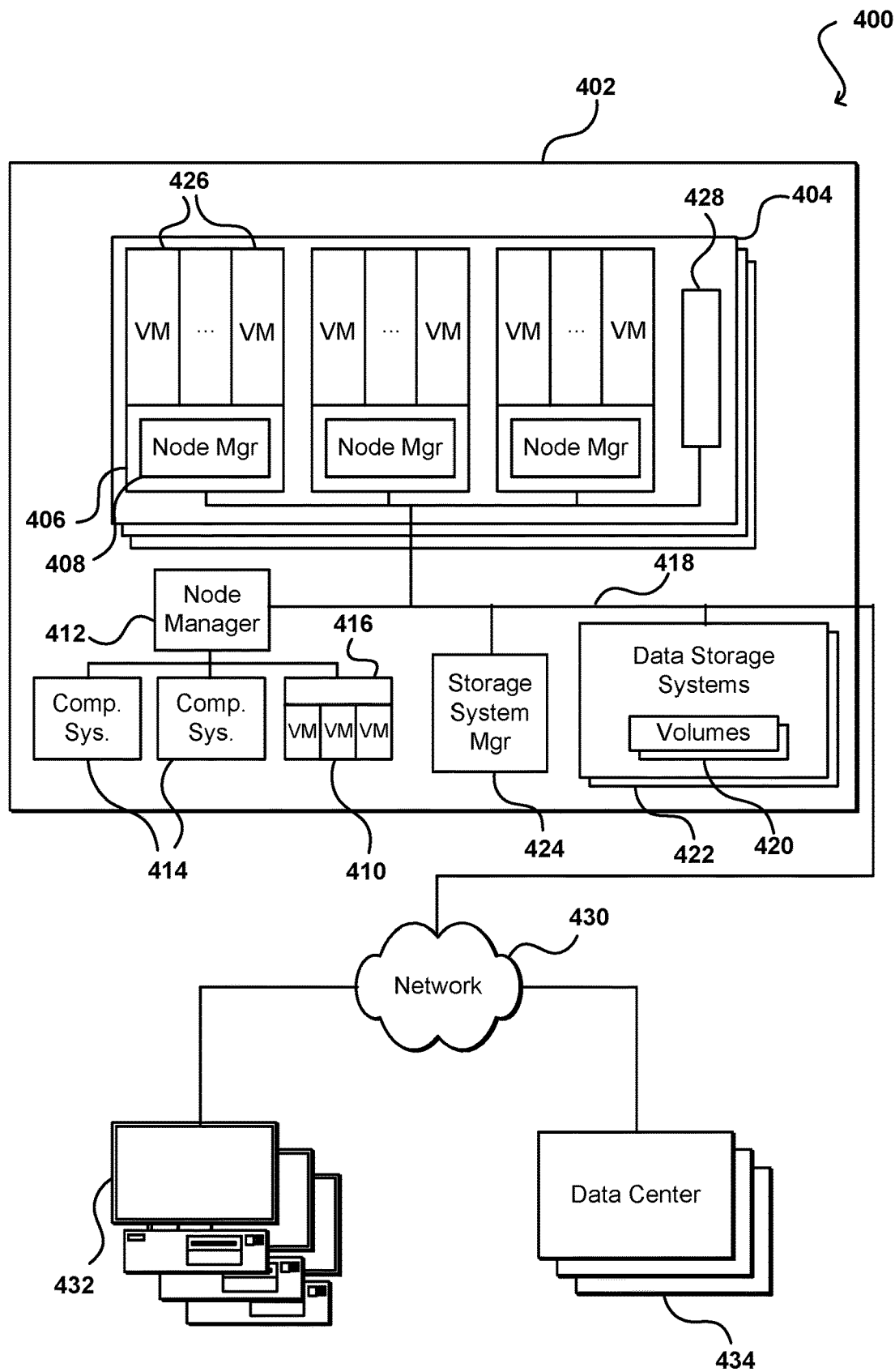
FIG. 4 illustrates an example environment in which aspects of the various embodiments can be implemented.

FIG. 4 illustrates an example network configuration 400 in which computing and data access operations can be performed, along with authenticated encryption and other such functionality, in accordance with various embodiments. This configuration can include components offered as part of a multi-tenant environment, or resource provider environment 402, wherein the components are provided by a resource provider, and customers pay for access and/or utilization of respective portions of those resources. In this example configuration, the resource provider environment includes a number of racks 404, each rack including a number of host computing devices 406. The host computing systems 406 each host one or more virtual machines. Each virtual machine can act as an independent resource node for executing one or more program copies or performing another such action or process for user data requests, I/O operations, etc. This example configuration also includes computer systems that execute a data storage system or service. The service can utilize a pool of multiple data storage systems, which each have local storage for use in storing one or more volumes 410. Access to the volume copies 410 is provided over an internal network to programs executing on various resource nodes. Thus, an application executing on a virtual machine instance on one of the computer systems 406 can be connected with one or more storage volumes 410 in the data storage systems. This is referred to herein as the instance being "attached" to the storage volume(s). In this example configuration, multiple computing systems are operable to execute various programs, applications, and/or services, and further operable to access reliable data storage, such as under the control of a data storage service. A data storage service can use multiple data storage systems in a data center to provide reliable, non-local, data storage to executing programs or various other components, systems, or services. Multiple remote archival storage systems external to the data center may also be used to store additional copies of at least some portions of at least some data storage volumes.

In this example, a data center 402 includes a number of racks 404, each rack including a number of host computing devices 406, as well as an optional rack support computing system 428 in this example embodiment. The host computing systems 406 on the illustrated rack 404 each host one or more virtual machines 426 in this example, as well as a distinct node manager module 412 associated with the virtual machines on that host computing system to manage those virtual machines. One or more other host computing systems 416 may also each host one or more virtual machines 410 in this example. Each virtual machine 410 may act as an independent resource node for executing one or more program copies or performing another such action or process for user data requests, I/O operations, etc. In addition, this example data center 402 further includes additional host computing systems 414 that do not include distinct virtual machines, but may nonetheless each act as a resource node for one or more tasks being executed for a user. In this example, a node manager module 412 executing on a computing system (not shown) distinct from the host computing systems 414 and 416 is associated with those host computing systems to manage the resource nodes provided by those host computing systems, such as in a manner similar to the node manager modules 408 for the host computing systems 406. The rack support computing system 428 may provide various utility services for other computing systems local to its rack 404 (e.g., long-term program storage, metering, and other monitoring of program execution and/or of non-local data storage access performed by other computing systems local to the rack, etc.), as well as possibly to other computing systems located in the data center. Each computing system may also have one or more local attached storage devices (not shown), such as to store local copies of programs and/or data created by or otherwise used by the executing programs, as well as various other components.

This example the data center 402 also includes a computing system 424 that executes a data storage system manager module for the data storage service (e.g., a block-based data storage service) to assist in managing the availability of non-local data storage to programs executing on resource nodes provided by the host computing systems located within the data center (or optionally on computing systems located in one or more other data centers 434, or other remote computing systems 432 external to the data center). In particular, in this example the data center 402 includes a pool of multiple data storage systems 422, which each have local storage for use in storing one or more volume copies 420. Access to the volume copies 420 is provided over the internal network(s) 418 to programs executing on various resource nodes 410 and 414. As discussed in greater detail elsewhere, a data storage system manager module 424 may provide a variety of services related to providing non-local data storage functionality, including the management of user accounts (e.g., creation, deletion, billing, etc.); the creation, use and deletion of data storage volumes and snapshot copies of those volumes; the collection and processing of performance and auditing data related to the use of data storage volumes and snapshot copies of those volumes; the obtaining of payment from customers or other users for the use of data storage volumes and snapshot copies of those volumes; etc. In some embodiments, the data storage system manager module 422 may coordinate with the node manager modules 412, 408 to manage use of volumes by programs executing on associated resource nodes, while in other embodiments the node manager modules may not be used to manage such volume use. In addition, in other embodiments, one or more data storage system manager modules 424 may be structured in other manners, such as to have multiple instances of the data storage system manager executing in a single data center (e.g., to share the management of non-local data storage by programs executing on the resource nodes provided by the host computing systems located within the data center), and/or such as to have at least some of the functionality of a data storage system manager module being provided in a distributed manner by software executing on some or all of the server data storage systems 422 (e.g., in a peer-to-peer manner, without any separate centralized data storage system manager module on a computing system 424).

In this example, the various host computing systems, server data storage systems, and computing systems are interconnected via one or more internal networks 418 of the data center, which may include various networking devices (e.g., routers, switches, gateways, etc.) that are not shown. In addition, the internal networks 418 are connected to an external network 430 (e.g., the Internet or another public data network) in this example, and the data center 402 may further include one or more optional devices (not shown) at the interconnect between the data center and an external network (e.g., network proxies, load balancers, network address translation devices, etc.). In this example, the data center 402 is connected via the external network 430 to one or more other data centers 434 that each may include some or all of the computing systems and storage systems illustrated with respect to data center 402, as well as other remote computing systems 432 external to the data center. The other computing systems 432 may be operated by various parties for various purposes, such as by the operator of the data center or third parties (e.g., customers of the program execution service and/or of the data storage service). In addition, one or more of the other computing systems may be archival storage systems (e.g., as part of a remote network-accessible storage service) with which the data storage service may interact, such as under control of one or more archival manager modules (not shown) that execute on the one or more other computing systems or instead on one or more computing systems of the data center, as described in greater detail elsewhere. Furthermore, while not illustrated here, in at least some embodiments, at least some of the server data storage systems 422 may further be interconnected with one or more other networks or other connection mediums, such as a high-bandwidth connection over which the storage systems 422 may share volume data (e.g., for purposes of replicating copies of volumes and/or maintaining consistency between primary and mirror copies of volumes), with such a high-bandwidth connection not being available to the various host computing systems in at least some such embodiments.

It will be appreciated that the example of FIG. 4 has been simplified for the purposes of explanation, and that the number and organization of host computing systems, server data storage systems and other devices may be much larger than what is depicted in FIG. 4. For example, as one illustrative embodiment, there may be thousands of computing systems per data center, with at least some of those computing systems being host computing systems that may each host fifteen virtual machines or more, and/or with some of those computing systems being block-based data storage systems that may each store several volume copies. If each hosted virtual machine executes one program, then such a data center may execute as many as tens of thousands of program copies at one time. Furthermore, hundreds or thousands (or more) of volumes may be stored on the server data storage systems, depending on the number of server storage systems, size of the volumes, and number of mirror copies per volume. It will be appreciated that in other embodiments, other numbers of computing systems, programs and volumes may be used.

An environment such as that illustrated with respect to FIG. 4 can be used to provide and manage resources shared among various customers. In one embodiment, a virtualized storage system can be provided using a number of data servers, each having a number of storage devices (e.g., storage disks) attached thereto. The storage system can expose the storage to the customers as a Web service, for example. Customers then can submit Web services requests, or other appropriate requests or calls, to allocate storage on those servers and/or access that storage from the instances provisioned for those customers. In certain embodiments, a user is able to access the data volumes of these storage devices as if those storage devices are conventional storage devices. Since the data volumes will appear to the customer instances as if each volume is a disk drive or similar storage device, the volumes can be addressed with offsets, lengths, and other such conventional storage device aspects. Further, such a system can provide what will be referred to herein as "read after write" consistency, wherein data is guaranteed to be able to be read from the data as soon as the data is written to one of these data volumes. Such a system can provide relatively low latency, such as latencies less than about ten milliseconds. Such a system thus in many ways functions as a traditional storage area network (SAN), but with improved performance and scalability.

Using a management system as illustrated in FIG. 4, for example, a customer can make a Web service call into an appropriate API of a Web service layer of the system to provision a data volume and attach that volume to a data instance for that customer. The management system can be thought of as residing in a control plane, or control environment, with the data volumes and data storage devices residing in a separate data plane, or data environment. In one example, a customer with at least one provisioned instance can call a "CreateVolume" or similar API, via Web services, which enables the customer to specify the amount of storage to be allocated, such as a value between 1 GB and 1 TB, in 1 GB increments. Components of the control plane, such as a data storage system manager module, can call into the data plane to allocate the desired amount of storage from the available resources, and can provide the customer with an identifier for the data volume. In some embodiments, the customer then can call an "AttachVolume" or similar API, wherein the customer provides values for parameters such as an instance identifier, a volume identifier, and a device name, depending on factors such as the operating system of the instance, using a scheme that the operating system provides for hard drives and similar storage devices, as from inside the instance there is no apparent difference, from at least a functionality and naming point of view, from a physical hard drive. Once the customer has attached the data volume to a provisioned instance, the customer can cause various functionality to be performed, such as to build a file system, use as raw storage for a data system, or any other such activity that would normally be performed with a conventional storage device. When the customer no longer requires the data volume, or for any other appropriate reason, the customer can call a "DetatchVolume" or similar API, which can cause the association of the instance to that volume to be removed. In some embodiments, the customer can then attach a new instance or perform any of a number of other such activities. Since the data volume will fail independently of the instances in some embodiments, the customer can attach a volume to a new instance if a currently associated instance fails.

Figure 5:
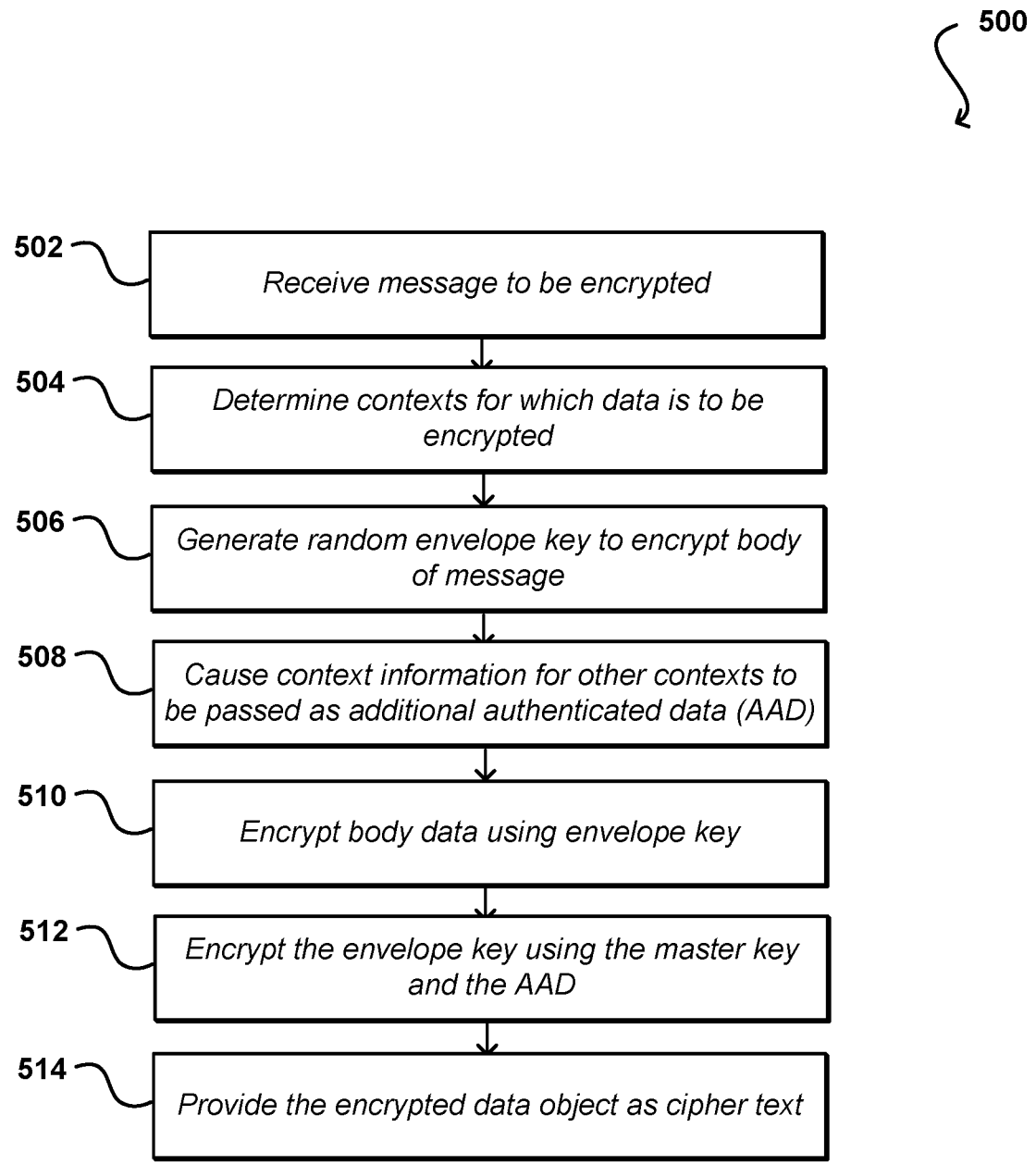
FIG. 5 illustrates a first example process for using authenticated encryption to secure a received message that can be utilized in accordance with various embodiments.

As mentioned, the different types of resources, services, channels, and other aspects of the environment of FIG. 4 can each potentially correspond to a different context for data encryption as discussed herein. FIG. 5 illustrates an example process 500 for encrypting data for multiple contexts that can be utilized in accordance with various embodiments. It should be understood for the various processes described herein that additional, fewer, or alternative steps can be performed in similar or alternative orders, or in parallel, within the scope of the various embodiments unless otherwise stated. In this example, a message is received 502 that is to be encrypted using authenticated encryption. While a message is used in this example, it should be understood that various other types of data objects, elements, or strings can be encrypted using such an approach as well within the scope of the various embodiments. As mentioned, the data object may need to be secured for multiple contexts, such as where the data is stored to two or more different types of storage or storage locations, transmitted using a secured channel, accessible by different types of resources, etc. In order to provide for multi-context authenticated encryption, the approach can determine 504 the contexts for which the data is to be encrypted. This can include existing contexts for which the data is already encrypted or all contexts for which the data is to be encrypted, among other such options. The encryption can be updated for each change in context as well in at least some embodiments. In this example, an envelope key is generated 506, such as by using a random key generation approach, that can be used to encrypt the body of the message. In this example, information for the various contexts can be caused 508 to be passed or provided as additional authenticated data (AAD) for use with the encryption. The body data for the message can then be encrypted 510 using the relevant envelope key. The envelope key can then be encrypted 512 using a master key for the customer, for example, and the provided AAD. As mentioned, the AAD can include information such as a path or identifier for a resource, as well as a user identifier or other such information. In other embodiments a limited subset of this information may be utilized for the AAD. Using the AAD with the master key will prevent someone obtaining the master key from being able to decrypt and utilize the appropriate envelope key unless they also have access to all the appropriate context information. As mentioned, the AAD information will not be stored on the system in at least some embodiments and must be generated from the context information, such that a malicious party obtaining the master key cannot simply also obtain the AAD to use for the decryption. In this example, the encoded data object (i.e., the message) can be provided 514 as cipher text, which can include a header, encrypted envelope key, and encrypted body text in at least some embodiments.

Figure 6:
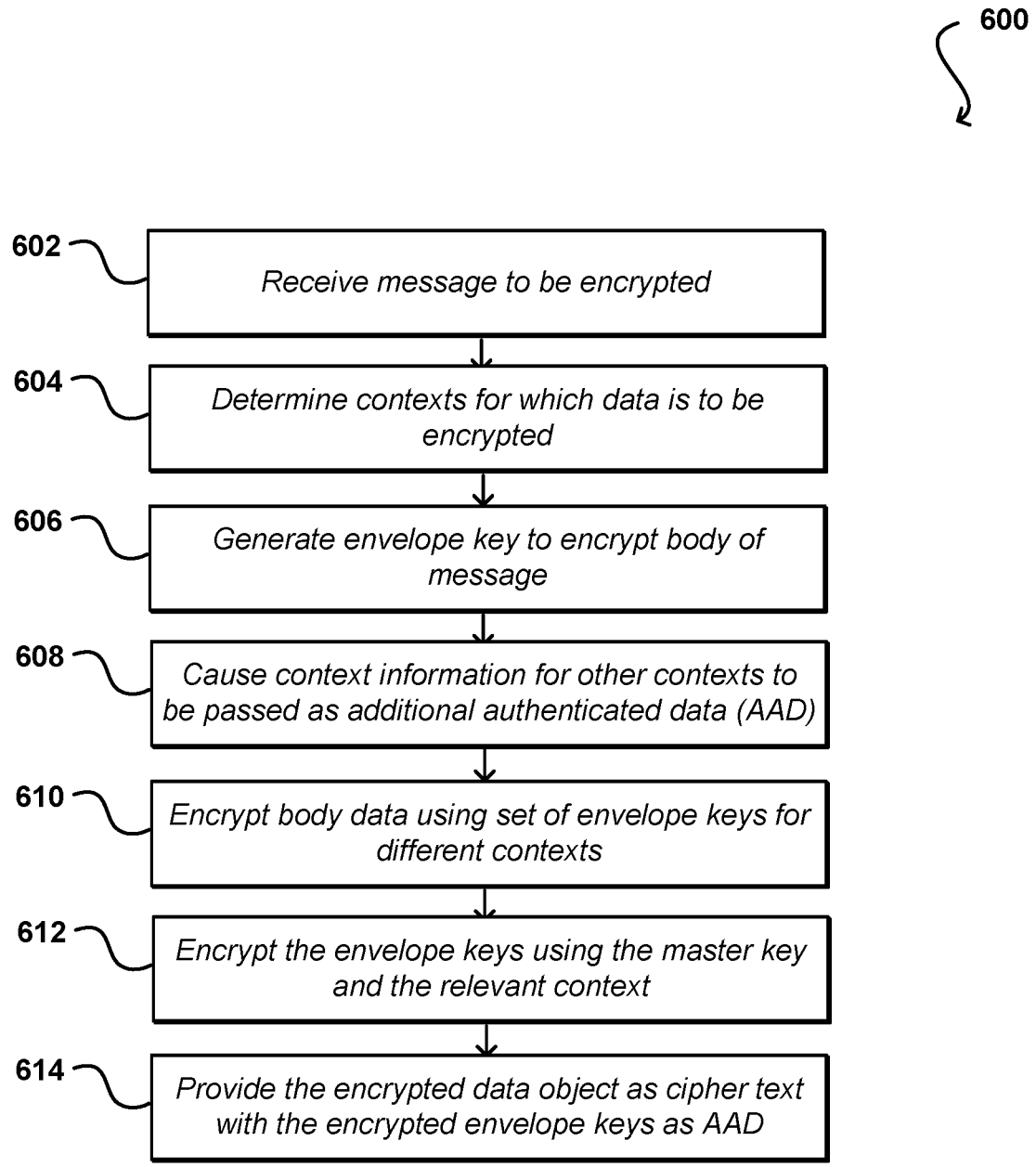
FIG. 6 illustrates a second example process for using authenticated encryption to secure a received message that can be utilized in accordance with various embodiments.

FIG. 6 illustrates another example process 600 for using authenticated encryption to secure message content that can be utilized in accordance with various embodiments. In this example, as with the previously described process, a message is received 602 that is to be encrypted using authenticated encryption. In order to provide multi-context authenticated encryption, the approach can determine 604 the contexts for which the message is to be encrypted. An envelope key is generated 606 as discussed herein to be used to encrypt the body of the message. Information for the various contexts can be caused 608 to be passed or provided as additional authenticated data (AAD) for use with the encryption.

Instead of encrypting the envelope key with the various context information, however, in this example the body data is encrypted 610 using a set of envelop keys, each of which corresponds to a different context. The envelope keys themselves can then each be encrypted 612 using the same master key but also the relevant portion of the AAD for a particular context. If there are three different contexts for the message, there can then be three different envelope keys that are each encrypted using the master key and the corresponding context information. The encrypted data object can then include the encrypted envelope keys as the AAD for the message. The encrypted data can again be provided 614 as cipher text with the encrypted envelope keys included as the AAD for the message. As with the above process, a data consumer wishing to decrypt the message must be able to first decrypt the appropriate envelop key using the appropriate context information.

Figure 7:
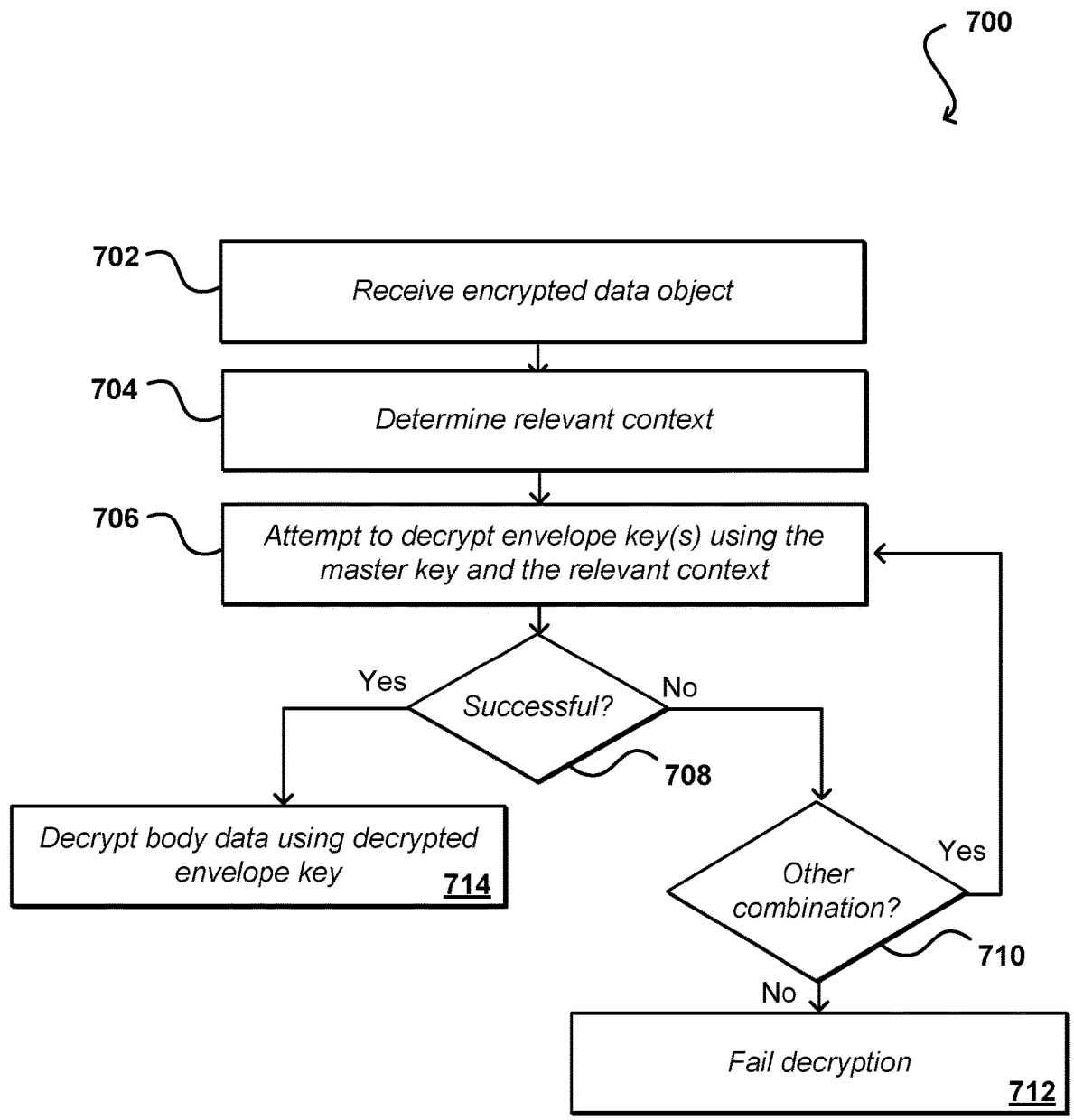
FIG. 7 illustrates an example process for decrypting a message encrypted using authenticated encryption for multiple contexts that can be utilized in accordance with various embodiments.

FIG. 7 illustrates an example process 700 for decrypting a data object (e.g., cipher text) encrypted using multi-context authenticated encryption that can be utilized in accordance with various embodiments. In this example, the encrypted data object is received 702 or otherwise obtained. In order to attempt to decrypt the object, the relevant context 704 is first determined. This can be determined based at least in part upon information in the object header, or the type of resource from which the object was received or is to be stored, among other such options. Depending upon the type of encryption process used, this can include determine the relevant information for all contexts for the data object, or information for only the currently relevant context, among other such options. An attempt can be made 706 to decrypt the envelope key (or one of the envelope keys if there are more than one) for the message. This can include, for example, passing the appropriate AAD for the various contexts or passing the appropriate context data for used to encrypt one of the envelope keys, among other such options. As mentioned, the decryption process also requires the master key in this example that was used with the context data to encrypt the envelope key. If the decryption of one of the envelope keys (or the envelope key, if only one) is determined 708 to be unsuccessful, another determination can be made 710 as to whether there are additional combinations or other information to use to attempt to decrypt one of the envelope keys. As mentioned, this can include attempting a different set of context information for a specific envelope key, or attempting to decrypts a different envelope key with the same context information, among other such options. If all appropriate combinations have been attempted unsuccessfully, the decryption attempt can fail 712. Otherwise, if an envelope key is successfully decrypted then the body data can be decrypted 712 using the decrypted envelope key.

Figure 8:
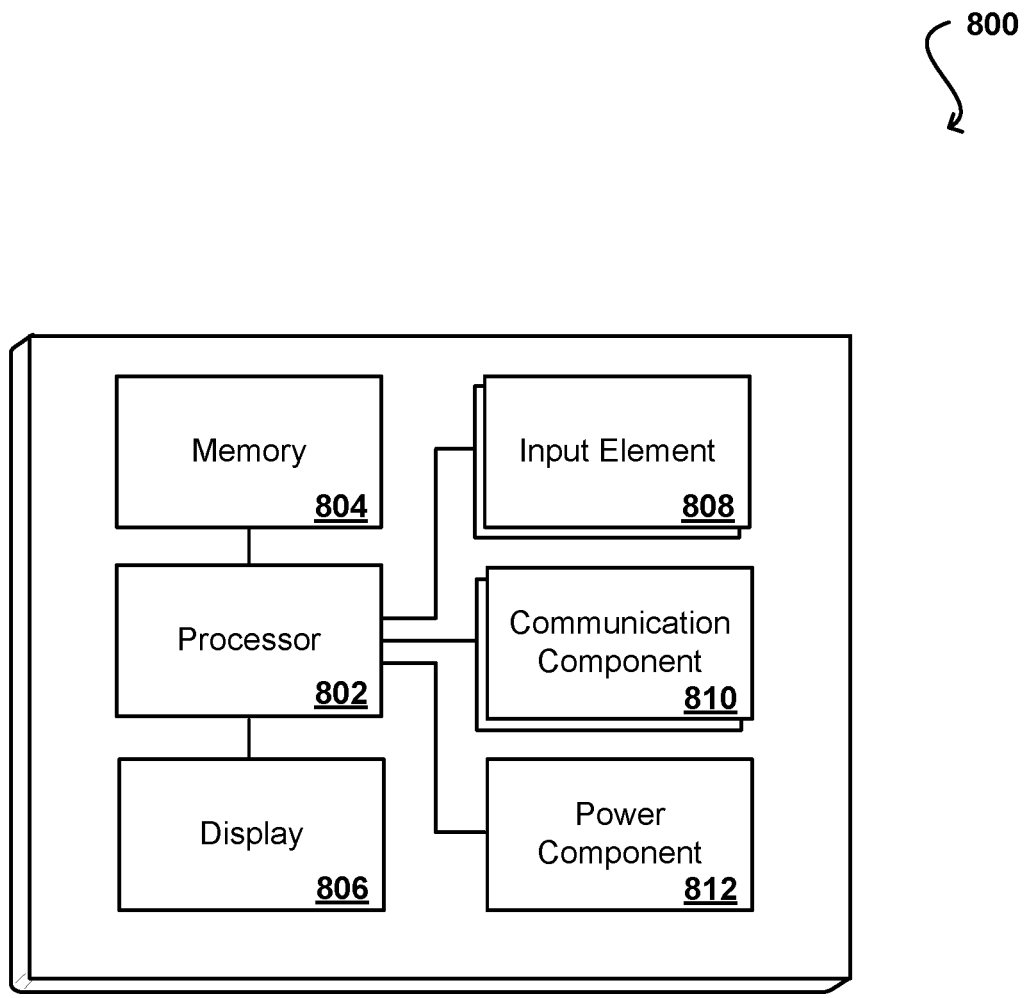
FIG. 8 illustrates components of an example computing device that can be used to perform aspects of the various embodiments.

FIG. 8 illustrates a logical arrangement of a set of general components 800 of an example computing device that can be used to implement aspects of the various embodiments. In this example, the device includes at least one processor 802 (e.g., a CPU and/or GPU) for executing instructions that can be stored in a memory device or element 804. As would be apparent to one of ordinary skill in the art, the device can include many types of memory, data storage, or non-transitory computer-readable storage media, such as a first data storage for program instructions for execution by the processor 802, a separate storage for images or data, a removable memory for sharing information with other devices, etc. The device may include some type of display element 806, such as a touch screen or liquid crystal display (LCD), although devices such as portable media players might convey information via other means, such as through audio speakers. In some embodiments, the computing device 800 can include one or more networking and/or communication elements 808, such as a Wi-Fi, Bluetooth, RF, wired, or wireless communication system. The device in many embodiments can communicate with a network, such as the Internet, and may be able to communicate with other such devices. In some embodiments the device can include at least one additional input component 810 able to receive conventional input from a user. This conventional input can include, for example, a push button, touch pad, touch screen, wheel, joystick, keyboard, mouse, keypad, or any other such device or element whereby a user can input a command to the device. In some embodiments, however, such a device might not include any buttons at all, and might be controlled only through a combination of visual and audio commands, such that a user can control the device without having to be in contact with the device. The device will also include one or more power components 812, such as a power source, battery compartment, wireless charging circuitry, and the like, for providing and/or obtaining the power needed for the computing device.

As discussed, different approaches can be implemented in various environments in accordance with the described embodiments. As will be appreciated, although a Web-based environment may be used for many examples herein for purposes of explanation, different environments may be used, as appropriate, to implement various embodiments. Such a system can include one or more electronic client devices, which can include any appropriate device operable to send and receive requests, messages or information over an appropriate network and convey information back to a user of the device. Examples of such client devices include personal computers, cell phones, handheld messaging devices, laptop computers, set-top boxes, personal data assistants, electronic book readers and the like. The network can include any appropriate network, including an intranet, the Internet, a cellular network, a local area network or any other such network or combination thereof Components used for such a system can depend at least in part upon the type of network and/or environment selected. Protocols and components for communicating via such a network are well known and will not be discussed herein in detail. Communication over the network can be enabled via wired or wireless connections and combinations thereof An illustrative environment can include at least one application server and data store. It should be understood that there can be several application servers, layers or other elements, processes or components, which may be chained or otherwise configured, which can interact to perform tasks such as obtaining data from an appropriate data store. As used herein the term "data store" refers to any device or combination of devices capable of storing, accessing and retrieving data, which may include any combination and number of data servers, databases, data storage devices and data storage media, in any standard, distributed or clustered environment. The application server can include any appropriate hardware and software for integrating with the data store as needed to execute aspects of one or more applications for the client device and handling a majority of the data access and business logic for an application. The application server provides access control services in cooperation with the data store and is able to generate content such as text, graphics, audio and/or video to be transferred to the user, which may be served to the user by the Web server in the form of HTML, XML or another appropriate structured language in this example. The handling of all requests and responses, as well as the delivery of content between the client device and the application server, can be handled by the Web server. It should be understood that the Web and application servers are not required and are merely example components, as structured code discussed herein can be executed on any appropriate device or host machine as discussed elsewhere herein.

Each server typically will include an operating system that provides executable program instructions for the general administration and operation of that server and typically will include computer-readable medium storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated. Thus, the depiction of any system herein should be taken as being illustrative in nature and not limiting to the scope of the disclosure.

As discussed above, the various embodiments can be implemented in a wide variety of operating environments, which in some cases can include one or more user computers, computing devices, or processing devices which can be used to operate any of a number of applications. User or client devices can include any of a number of general purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems, and other devices capable of communicating via a network.

Various aspects also can be implemented as part of at least one service or Web service, such as may be part of a service-oriented architecture. Services such as Web services can communicate using any appropriate type of messaging, such as by using messages in extensible markup language (XML) format and exchanged using an appropriate protocol such as SOAP (derived from the "Simple Object Access Protocol"). Processes provided or executed by such services can be written in any appropriate language, such as the Web Services Description Language (WSDL). Using a language such as WSDL allows for functionality such as the automated generation of client-side code in various SOAP frameworks.

Most embodiments utilize at least one network that would be familiar to those skilled in the art for supporting communications using any of a variety of commercially-available protocols, such as TCP/IP, FTP, UPnP, NFS, and CIFS. The network can be, for example, a local area network, a wide-area network, a virtual private network, the Internet, an intranet, an extranet, a public switched telephone network, an infrared network, a wireless network, and any combination thereof.

In embodiments utilizing a Web server, the Web server can run any of a variety of server or mid-tier applications, including HTTP servers, FTP servers, CGI servers, data servers, Java servers, and business application servers. The server(s) also may be capable of executing programs or scripts in response requests from user devices, such as by executing one or more Web applications that may be implemented as one or more scripts or programs written in any programming language, such as Java®, C, C# or C++, or any scripting language, such as Perl, Python, or TCL, as well as combinations thereof The server(s) may also include database servers, including without limitation those commercially available from Oracle®, Microsoft®, Sybase®, and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media and other non-transitory computer readable media for containing code, or portions of code, can include any appropriate media known or used in the art, such as but not limited to volatile and non-volatile, removable and non-removable non-transitory media implemented in any method or technology for storage of information such as computer readable instructions, data structures, program modules, or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices, or any other medium which can be used to store the desired information and which can be accessed by the a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A computer-implemented method, comprising: receiving a message to be encrypted, the message including body data stored by at least two resources; determining context data for the resources, the context data including at least identifying information for each of the resources that is unique to each of the resources; generating a set of envelope keys, the set including an envelope key for each resource for which context data is determined; encrypting the body data using the set of envelope keys; encrypting each envelope key with a master key, corresponding to the body data, and a respective subset of the context data corresponding to the envelope key; and providing an encrypted data object including at least the encrypted body data and the set of encrypted envelope keys, wherein the master key and a respective subset of the context data for one of the resources is needed to decrypt one of the encrypted envelope keys for purposes of decrypting the encrypted body data.

2. The computer-implemented method of claim 1, further comprising: passing the respective subset of the context data to an authenticated encryption algorithm as additional authenticated data (AAD); and utilizing the additional authenticated data for the encryption along with the master key.

3. The computer-implemented method of claim 1, further comprising: generating cipher text as the encrypted data object, the cipher text including at least one header, the encrypted body data, and the encrypted envelope keys concatenated as an additional authenticated data string.

4. The computer-implemented method of claim 1, further comprising: receiving the encrypted data object; determining the master key and specified context data corresponding to a determined type of the resources; attempting to decrypt the encrypted envelope keys using the master key and the specified context data until one of the envelope keys is successfully decrypted; and decrypting the body data using the successfully decrypted envelope key.

5. The computer-implemented method of claim 1, further comprising: specifying, in a header of the encrypted data object, lengths of fields in the encrypted data object and instances of the context data mapped to the fields, wherein a data consumer attempting to decrypt one of the envelope keys using an instance of context data is able to determine an appropriate location of a specified envelope key.

6. A computer-implemented method, comprising: obtaining a data object to be encrypted, the data object accessible to at least two resources; determining respective instances of context data for each of the resources, the context data unique to each of the resources and based on an identifier of the respective resource; encrypting body data of the data object using an envelope key; encrypting, using an authenticated encryption algorithm, the envelope key with a master key and at least a relevant instance of the context data as additional authenticated data; and providing an encrypted data object including encrypted body data for the data object and the encrypted envelope key.

7. The computer-implemented method of claim 6, further comprising: encrypting multiple envelope keys, each envelope key encrypted using the master key and a respective instance of the context data; and including the multiple encrypted envelope keys in the encrypted data object.

8. The computer-implemented method of claim 7, further comprising: receiving the encrypted data object; determining the master key and at least the relevant instance of the context data; attempting to decrypt the encrypted envelope key using the master key and the relevant instance of the context data until one of the envelope keys is successfully decrypted; and decrypting the body data using the successfully decrypted envelope key.

9. The computer-implemented method of claim 6, further comprising: encrypting the envelope key using the master key and the respective instances of context data, the respective instances including a subset of available context data including at least a set of resource identifiers.

10. The computer-implemented method of claim 9, further comprising: receiving the encrypted data object; determining the master key and respective instances of context data; and decrypting the encrypted envelope key using the master key and the respective instances of context data; and decrypting the body data using the successfully decrypted envelope key.

11. The computer-implemented method of claim 6, further comprising: specifying, in a header of the encrypted data object, lengths of fields in the encrypted data object, wherein a data consumer attempting to decrypt one of the envelope keys is able to determine an appropriate location of a specified envelope key.

12. The computer-implemented method of claim 6, further comprising: passing the respective instances of context data to an authenticated encryption algorithm as additional authenticated data (AAD); and utilizing the additional authenticated data for the encryption along with the master key.

13. The computer-implemented method of claim 6, further comprising: further encrypting the envelope key with at least one additional master key associated with at least a second type of resource.

14. The computer-implemented method of claim 6, wherein the relevant instance of the context data is not included in the encrypted data object.

15. The computer-implemented method of claim 6, wherein the authenticated encryption algorithm uses a Galois/Counter Mode (GCM) mode of operation.

16. A system, comprising: at least one processor; and memory including instructions that, when executed by the at least one processor, cause the system to: obtain a data object to be encrypted, the data object accessible to at least two types of resources; determine respective instances of context data for each the types of the resources, the context data unique to each of the resources and based on an identifier of the respective resource; encrypt, using an authenticated encryption algorithm, the body object with a master key and the context data as additional authenticated data; and provide an encrypted data object including encrypted body data for the data object.

17. The system of claim 16, wherein the context data is not separately included in the encrypted data object.

18. The system of claim 16, wherein the instructions when executed further cause the system to: receive the encrypted data object; determine the master key and the context data; and decrypt the body data using the master key and the context data as additional authenticated data.

19. The system of claim 16, wherein the instructions when executed further cause the system to: encrypt the master key using a subset of available context data including at least a set of resource identifiers.

20. The system of claim 16, wherein the instructions when executed further cause the system to: further encrypt the envelope key with at least one additional master key associated with at least a second type of resource.

* * * * *